Aug. 18, 1970 K. C. DENNEY 3,525,054

FREQUENCY SHIFT KEYING CIRCUIT

Filed Aug. 26, 1968

INVENTOR

KENNETH C. DENNEY

BY McLean, Morton & Boustead

ATTORNEYS

United States Patent Office 3,525,054

Patented Aug. 18, 1970

3,525,054

FREQUENCY SHIFT KEYING CIRCUIT

Kenneth C. Denney, Tulsa, Okla., assignor to Sinclair Oil Corporation, a corporation of New York Filed Aug. 26, 1968, Ser. No. 755,250
Int. Cl. H03b 5/12

U.S. Cl. 331—49 7 Claims

ABSTRACT OF THE DISCLOSURE

A signalling circuit including first and second oscillators having distinct frequencies. An input signal of one polarity activates one oscillator while holding the other inactive. An input signal of opposite polarity activates the second oscillator while holding the first inactive.

Figures 1, 2:
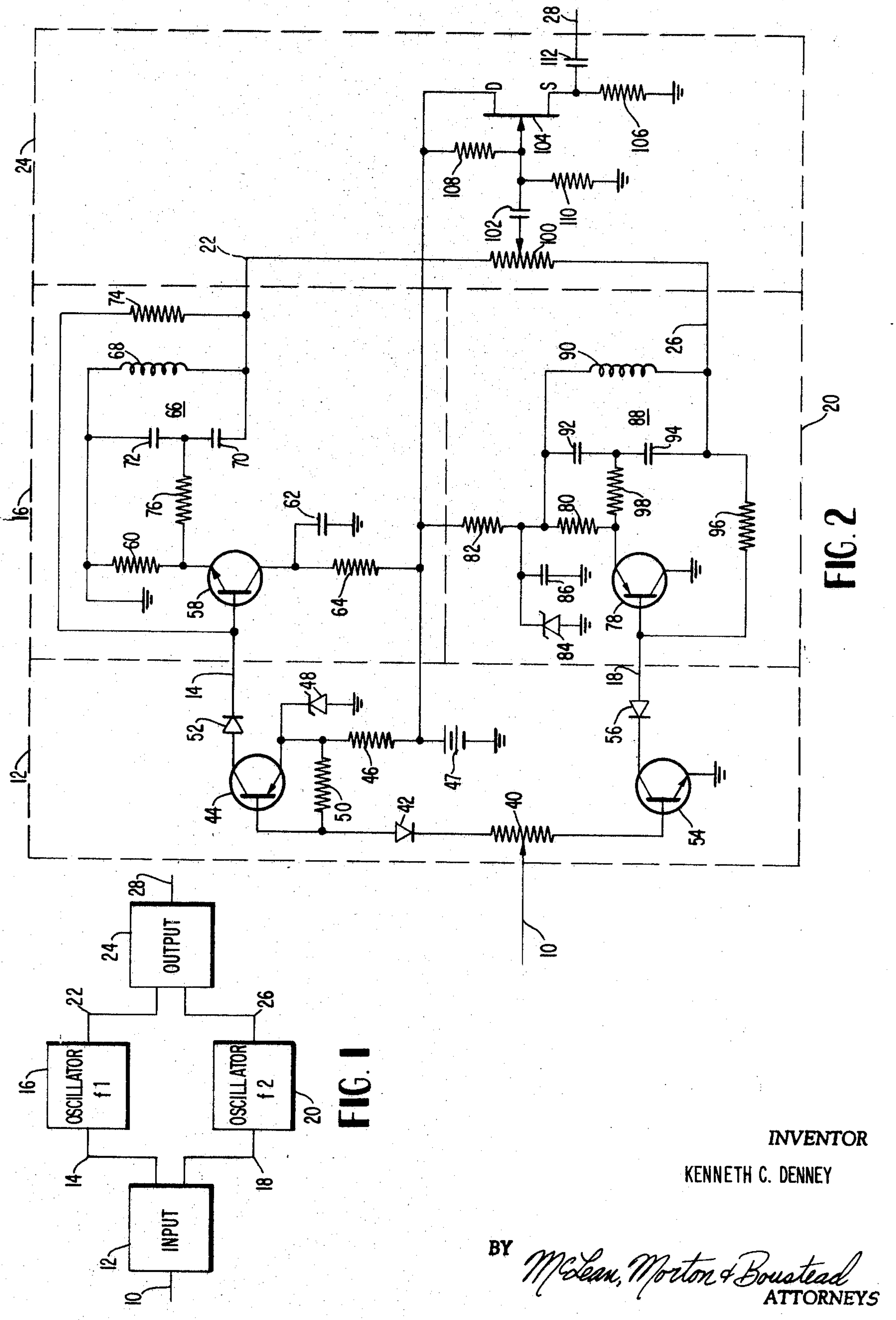

The present invention pertains to a signalling circuit. More particularly, the present invention pertains to a signalling circuit which is suitable for use as a transmitter in a telemetering system and which provides an output of a periodic waveform having a frequency determined by the state of the input.

It is frequently desired to provide at one location an indication of a two-state condition at some remote location. Thus, for example, in large industrial plants such as petroleum refineries, monitoring equipment may ascertain the condition of some equipment within the plant. Personnel who control that equipment may be located a considerable distance from the monitoring position. To permit efficient operation of the plant, it is desirable for the control personnel to be able to ascertain the condition at the remote monitoring point without having to travel to that point. If control functions are required, they can often be accomplished by equipment operated remotely from the control site. Frequently, no control functions are involved, but the monitoring is done to maintain a record of conditions at the monitoring site.

Often the condition of interest can be reduced to simply a two state condition, such as safe-unsafe or off-on. This two-state condition can easily be detected by a transducer which then provides a voltage having a polarity or magnitude dependent upon the monitored state. While a direct current telemetering signal can be transmitted by wire from the monitoring station to the control station, it is impractical to use wire transmission over long distances, and thus frequently radio transmission is utilized. Indication of a two-state condition by presence or absence of a signal is unreliable since absence of a signal may be the result of equipment breakdown rather than the indicated state.

The present invention is a signal generating circuit which is suitable for use within a telemetry transmitting system. An input signal of a first polarity activates a first oscillator, while holding a second oscillator in a deactivated state. As a consequence the circuit provides a sinusoidal output having a first frequency determined by the first oscillator. An input signal of opposite polarity activates the second oscillator, while deactivating the first oscillator, and so the circuit then provides a sinusoidal output of a second frequency determined by the characteristics of that second oscillator. The oscillator outputs are applied to an output circuit through which they may be passed to suitable transmission equipment. For example, the oscillator outputs may modulate a radio frequency carrier signal transmitted by a radio transmitter.

These and other aspects and advantages of the present invention are apparent in the following detailed description and claims, particularly when considered in conjunction with the accompanying drawings in which like parts bear like reference numerals. In the drawings:

FIG. 1 is a block diagram of the signalling circuit of the present invention; and, FIG. 2 is a schematic diagram of the circuit of FIG. 1.

The two state input signal is applied by line 10 to input circuit 12 depicted in FIG. 1. Input circuit 12 is connected by line 14 to first oscillator 16 and by line 18 to second oscillator 20. Oscillators 16 and 20 have distinct frequencies. The output of oscillator 16 is applied by line 22 to output circuit 24 which also receives the output of oscillator 20 on line 26. Line 28 applies the output signal from circuit 24 to appropriate utilization equipment.

As depicted in FIG. 2, input line 10 is tied to the sliding contact of potentiometer 40 within input circuit 12. One side of the fixed resistance of potentiometer 40 is connected to the cathode of diode 42 which has its anode tied to the base of PNP transistor 44. The emitter of transistor 44 is coupled through resistor 46 to a suitable source of positive voltage such as battery 47 which has its negative terminal grounded and which, for example, might provide a potential of 12 volts. The emitter of transistor 44 is also tied to the cathode of Zener diode 48 which has its anode tied to ground. Zener diode 48 clamps the emitter of transistor 44 to a suitable voltage level, for example, 5.6 volts D-C. The base of transistor 44 is coupled through resistor 50 to the cathode of Zener diode 48. The collector of transistor 44 is connected to the anode of diode 52 which has its cathode tied to output line 14 from circuit 12.

The second end of the fixed resistance of potentiometer 40 is tied to the base of NPN transistor 54 which has its emitter tied to ground. The collector of transistor 54 is connected to the cathode of diode 56, the anode of which is tied to output line 18 from circuit 12.

Within oscillator 16, line 14 is tied to the base of NPN transistor 58, which has its emitter coupled through resistor 60 to ground. The collector of transistor 58 is tied to one plate of capacitor 62, the second plate of which is connected to ground. The collector of transistor 58 is also coupled through resistor 64 to the positive voltage source 47.

Tank circuit 66 includes inductance coil 68 which is coupled across serially connected capacitors 70 and 72. The junction of coil 68 and capacitor 70 is coupled through resistor 74 to the base of transistor 58, while the junction of capacitor 72 and coil 68 is tied to ground. The junction of capacitors 70 and 72 is coupled through resistor 76 to the emitter of transistor 58. Output line 22 from oscillator 16 is connected to the junction of capacitor 70 and coil 68.

Oscillator 20 is of a construction similar to that of oscillator 16. Thus, within oscillator 20 the base of PNP transistor 78 is connected to output line 18 from circuit 12. The emitter of transistor 78 is coupled through serially connected resistors 80 and 82 to positive voltage source 47, while the collector of transistor 78 is tied to ground. The junction of resistors 80 and 82 is connected to the cathode of Zener diode 84 which has its anode tied to ground Zener diode 84 clamps this junction to a suitable voltage such as 6.0 volts D.C. Capacitor 86 is connected between the cathode of Zener diode 84 and ground.

Tank circuit 88 includes inductance coil 90 coupled across serially connected capacitors 92 and 94. The junction of capacitor 92 and coil 90 is tied to the cathode of Zener diode 84, while the junction of capacitor 94 and coil 90 is coupled through resistor 96 to the base of transistor 78. The junction of capacitors 92 and 94 is coupled through resistor 98 to the emitter of transistor 78. Output line 26 from oscillator 20 is connected to the junction of coil 90 and capacitor 94.

Within output circuit 24 potentiometer 100 has one end of its fixed resistance tied to output line 22 from oscillator 16 and the other end of its fixed resistance tied to output line 26 from oscillator 20. The sliding contact of potentiometer 100 is connected to one side of capacitor 102 which has its second side tied to the gate of field effect transistor (FET) 104. FET 104 is connected as a source follower with its drain tied to positive voltage source 47 and its source coupled through resistor 106 to ground. The gate of FET 104 is coupled through resistor 108 to its drain and is coupled through resistor 110 to ground. The source of FET 102 is coupled through capacitor 112 to output line 28.

In the quiescent condition with no input applied to line 10, both transistor 44 and transistor 54 are turned on. As a consequence, a positive voltage is applied through transistor 44 and diode 52 to the base of transistor 58 turning it on. Similarly the base of transistor 78 is coupled to ground through diode 56 and transistor 54, causing transistor 78 to turn on. A current path exists from positive voltage source 47 through resistor 46, the emitter-collector circuit of transistor 44, diode 52, and resistor 74 to one side of tank circuit 66. Consequently, current continuously flows through coil 68, and tank circuit 66 does not oscillate. Similarly, current flows from voltage source 47 through resistor 82, coil 90, resistor 96, diode 56, and the collector-emitter circuit of transistor 54 to ground, and tank circuit 88 does not oscillate. Capacitor 102 blocks direct voltages from the gate of FET 102. The quiescent current through FET 102 is blocked by capacitor 112, and so no voltage appears on output line 28.

When a positive voltage is applied to input line 10, transistor 54 remains in its conducting condition, and so oscillator 20 remains in its inactive state. This positive voltage on input line 10 causes transistor 44 to cut off, thereby terminating the current flow through that transistor to coil 68. As a result tank circuit 66 oscillates at its resonant frequency. Each time output line 22 goes positive, transistor 58 turns on, permitting current through its collector-emitter circuit to provide energy to tank circuit 66 to maintain the oscillations. The oscillations from tank circuit 66 are applied by line 22 to potentiometer 100. The sliding contact of potentiometer 100 passes the oscillations through capacitor 102 to the gate of FET 104. With each positive excursion of the oscillations, FET 104 conducts, and its source goes positive. Accordingly, the voltage on output line 28 oscillates at the frequency of tank circuit 66.

When the voltage on input line 10 is negative, transistor 44 conducts, and oscillator 16 is clamped in its inactive state. The negative voltage on input line 10 turns off transistor 54, terminating the current path through that transistor from tank circuit 88. Consequently tank circuit 88 oscillates at a frequency determined by coil 90 and capacitors 92 and 94. With each positive excursion of the oscillations, transistor 78 conducts, thereby permitting current to flow to tank circuit 88 to maintain the oscillations.

The oscillator signal from tank circuit 88 is applied by line 26 to potentiometer 100 within output circuit 24, and again with each positive excursion of the output signal FET 104 conducts. Thus the voltage on output line 28 oscillates at the frequency determined by tank circuit 88.

The voltage on line 28 can be utilized to control appropriate equipment. For example, the voltage on line 28 can be used to modulate a radio frequency carrier signal so that an indication of the polarity input voltage applied to line 10 can be obtained from the radio signal.

Potentiometer 40 permits adjustment of input circuit 12 to control the levels of input voltage which activate oscillators 16 and 20. Thus, potentiometer 40 might be adjusted for operation of the circuit with a 3 volt peak-to-peak square wave input centered about ground. Potentiameter 100 permits adjustment of the outputs from oscillators 16 and 20 to insure that FET 104 properly follows the oscillator output, thereby assuring linear operation.

The circuit of the present invention has been found capable of operation with oscillator 16 providing a 2500 hertz signal, oscillator 20 providing an 1800 hertz signal, and a square wave input signal of 3 volts peak-to-peak at 600 hertz. The energy stored in tank circuit 66 or 88 when the corresponding oscillator is inactive results in substantially immediate commencement of oscillations upon application of the appropriate input signal polarity.

While FIG. 2 depicts particular semiconductor types, substitutions could be made, and with appropriate voltage adjustments, the present invention would still result. Thus, although the present invention has been described with reference to preferred embodiments, numerous modifications and rearrangements can be made, and still the resulting circuit would be within the scope of the invention.

What is claimed is:

1. A signalling circuit for receiving on an input line two-state input signal and providing on an output line an altenating current output signal of a first frequency in response to an input signal of one of the two states and an alternating current output signal of a second frequency in response to an input signal of the other of the two states, said circuit comprising:

input means having first and second outputs and connected to the input line to receive the two-state input signal, said input means applying a signal on its first output in response to an input signal of said one of the two states and applying a signal on its second output in response to an input signal of said other of the two states;

first oscillator means connected to the first output of the input means, said first oscillator means being held inactive in the absence of a signal on said input means first output, said first oscillator means being activated in response to a signal on said input means first output to generate oscillations of a first frequency;

second oscillator means connected to the second output of the input means; said second oscillator means being held inactive in the absence of a signal on said input means second output, said second oscillator means being activated in response to a signal on said input means second output to generate oscillations of a second frequency;

output means connected to the first and second oscillators to apply oscillations therefrom to the output line.

2. A circuit as claimed in claim 1 in which the input means includes:

a first transistor connected in circuit with the input means first output, said first transistor held in its conducting condition in the absence of an input signal of said one of the two states and held in its non-conducting condition in the presence of an input signal of said one of the two states; and a second transistor connected in circuit with the input means second output, said second transistor held in its conducting condition in the absence of an input signal of said other of the two states and held in its non-conducting condition in the presence of an input signal of said other of the two states.

3. A circuit as claimed in claim 1 in which:

said first oscillator means includes a first tank circuit coupled to the input means first output, said first tank circuit being activated in the presence of an input signal of said one of the two states to generate oscillations of said first frequency, said first tank circuit being held inactive in the absence of an input signal of said one of the two states to prevent oscillation thereof; and said second oscillator means includes a second tank circuit coupled to the input means second output, said second tank circuit being activated in the presence of an input signal of said other of the two states to generate oscillations of said second frequency, said tank circuit being held inactive in the absence of an input signal of said other of the two states to prevent oscillation thereof.

4. A circuit as claimed in claim 3 in which the input means includes a first transistor connected in circuit with the input means first output and with the first tank circuit, said first transistor held in its conducting condition in the absence of an input signal of said one of the two states to cause current to flow in circuit through said first transistor and said first tank circuit, said first transistor held in its non-conducting condition in the presence of an input signal of said one of the two states to prevent current flow therethrough; and a second transistor connected in circuit with the input means second output and with the second tank circuit, said second transistor held in its conducting condition in the absence of an input signal of said other of the two states to cause current to flow in circuit through said second transistor and said second tank circuit, said second transistor held in its non-conducting condition in the presence of an input signal of said one of the two states to prevent current flow therethrough.

5. A circuit as claimed in claim 4 in which each oscillator means includes current supply means for supplying oscillation sustaining current to its tank circuit when that tank circuit is activated.

6. A circuit as claimed in claim 5 in which each current supply means includes a transistor coupled to its tank circuit to be switched on each time that tank circuit oscillates.

7. A circuit as claimed in claim 6 in which said output means includes transistor means having a control terminal and first and second current path terminals; and means for coupling said control terminal to said first and second tank circuits;

said transistor means having current flow between its current path terminals in response to oscillations applied to said coupling means.

References Cited

UNITED STATES PATENTS 2,919,412 12/1959 Tyler ---------------- 331—52

JOHN KOMINSKI, Primary Examiner

U.S. Cl. X.R.

331—52; 332—16